United States Patent [19]

Grossman

[11] 3,881,605

[45] May 6, 1975

[54] OBJECT ORIENTING DEVICE TO ASSIST ROBOT MANIPULATOR

[75] Inventor: David D. Grossman, Yorktown Heights, N.Y.

[73] Assignee: International Business Machines Corporation, Armonk, N.Y.

[22] Filed: June 29, 1973

[21] Appl. No.: 375,299

[52] U.S. Cl. ............... 214/1 CM; 33/174; 198/237; 271/210

[51] Int. Cl. ............... B65j 3/00

[58] Field of Search .............. 33/174; 73/71.1, 71.2, 73/71.3; 271/210, 227; 198/33 R, 33 AA, 40, 254–256, 244, 263, 237

[56] References Cited

UNITED STATES PATENTS

| | | | |
|---|---|---|---|
| 3,455,436 | 7/1969 | Berke | 198/40 |
| 3,559,984 | 2/1971 | Westra | 271/210 |
| 3,614,601 | 10/1971 | Heckman et al. | 340/265 |
| 3,623,593 | 11/1971 | Van Melle et al. | 198/33 AA |

*Primary Examiner*—Albert J. Makay
*Assistant Examiner*—Lawrence J. Oresky
*Attorney, Agent, or Firm*—Sughrue, Rothwell, Mion, Zinn & Macpeak

[57] ABSTRACT

A box having at least two sides and a base adjacent to one another and oriented at angles with respect to each of the others is disposed with the base planar surface inclined relative to the horizontal and vertical so that an object placed on the base will gravitate to the lowest point upon vibration of the box. A plurality of sensors may be provided in a predetermined pattern in the base adjacent the lowest point to provide a digital readout indicative of the final orientation of various objects which can be utilized to control a robot manipulator.

6 Claims, 19 Drawing Figures

TEST 4321
(1011)

TEST 4321
(0101)

TEST 4321
(1111)

TEST 4321
(0111)

TEST 4321
(1000)

TEST 4321
(1010)

TEST 4321
(0110)

TEST 4321
(1110)

TEST 987
(111)

TEST 987
(110)

TEST 987
(101)

TEST 987
(100)

TEST 987
(001)

TEST 987
(010)

OBJECT ORIENTING DEVICE TO ASSIST ROBOT MANIPULATOR

BACKGROUND OF THE INVENTION

1. Field of the Invention

The present invention is directed to a part orienting device and more specifically to a part orienting device having means for sensing the final orientation of the part to provide control information to a robot manipulator.

2. Prior Art

In the past, automatic assembly machines required that the individual parts be presented to the automatic manipulator in predetermined positions. This was usually accomplished by loading the parts into a magazine which proved to be extremely inflexible. Another way of orienting the parts was to use a special purpose orienting device for each part such as a vibratory feeder bowl. However, the cost of such an arrangement became excessive when a large number of different type parts were required.

In other prior art devices, the parts were disoriented upon presentation to the robot and the robot had the full responsibility for orienting each part. This suggests the possibility that the robot have some sort of TV eye through which it recognizes the existing orientation and takes appropriate orienting action. Research on pattern recognition over the past ten years or so, indicates that achieving this sort of function is a formidable technological problem.

SUMMARY OF THE INVENTION

The present invention provides a single orienting device which is capable of accepting any arbitrarily disoriented object and constraining it to be disposed in one of a small finite number of possible orientations. The present invention also provides for sensing the final orientation of the object to determine which of the small finite number of possible orientations the object is disposed in to provide a control signal for controlling a robot which will completely orient the object for final placement. In another aspect of this invention a small number of sensors is dispersed about the box to sense orientation.

The present invention provides an object orienting device wherein a dihedrally tipped box having at least two sides and a base disposed at angles to each other is secured to a vibrator so that an arbitrary, randomly disposed object on the base will gravitate to the lowest apex in one of a small finite number of possible orientations. The orienting box can itself contain sensors interfaced to a computer which could distinguish which of a number of possible orientations had been taken and which would control a robot manipulator accordingly without the need for the robot to perform any sensing operations.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
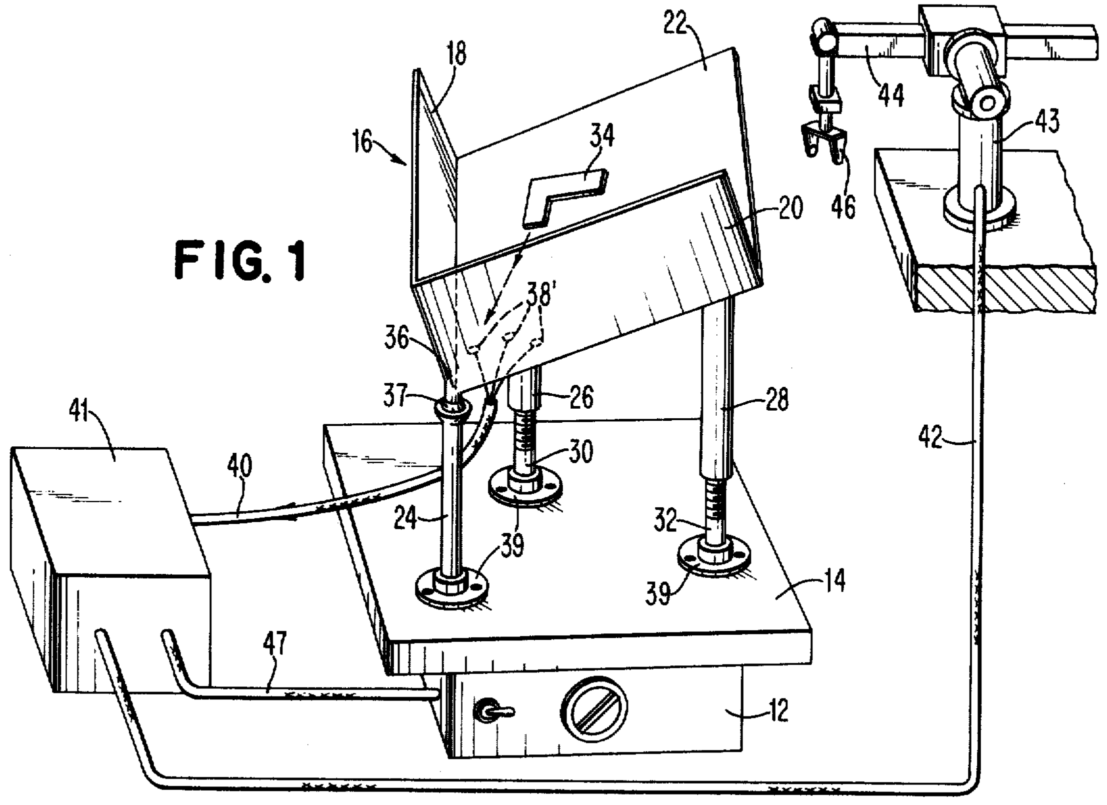
FIG. 1 is a schematic perspective view of an object orienting device and control system according to the present invention.

The object orientation device 10 as shown in FIG. 1 is comprised of a standard vibrating device 12 (such as a jogger) having a vibrating table 14 operatively connected thereto. Such vibrating devices are old and well known in the art and it is not deemed necessary to disclose them in detail. A box 16 is mounted on the table 14 and is provided with at least two sides 18 and 20 as well as a base 22. The two sides and the base can be disposed at right angles to each other but it is obvious that the sides need not be oriented at right angles. The box 16 is supported on the vibrating table 14, by means of three legs 24, 26 and 28, one or more of which may be adjustable to vary the angle at which the box is disposed relative to the horizontal and vertical. In the embodiment shown in FIG. 1, the legs 26 and 28 can be provided with extensions 30 and 32 respectively, which are threaded into the hollow legs 26 and 28 for longitudinal adjustment relative thereto. The three legs 24, 26 and 28 are secured to the vibrating table 14 by flanges 39 which can be movable for adjustability or any suitable means. The box can be pivoted on leg 24, by ball joint 37.

The surfaces of the base 22 and the sides 18 and 20 which are contacted by a part 34 may be of any suitable material such as wood, metal or plastic and if desired, the surfaces may be coated with a suitable antifriction material such as Teflon, (polytetrafluoroethylene) or the like. The optimum angle at which the base is disposed should be the friction angle for the particular set of materials used or slightly less. That is, the angle, preferably, should be such that the object 34 is on the verge of sliding when the table 14 is not vibrating and at the slightest movement to the box 16 would precipitate a downward sliding movement of the object 34 in the direction of the arrow along the base 22. Thus, depending upon the material of the object, and the material of the contacting surfaces of the box, the angle at which the box is disposed relative to the horizontal and vertical, will be adjusted accordingly.

When a known object 34 whose orientation is originally unknown is placed on the upper surface of the base 22, the object is immediately constrained by gravity to be in contact with the box at three or more points. As the box is vibrated, the object will slide in the general direction of the arrow in FIG. 1 and assuming the object comes in contact with the sidewall 20 before it comes in contact with the sidewall 18, the object will then be constrained to be in contact with the sidewall 20 at two or more points. The object 34 will continue to gravitate downwardly until it reaches the corner 36 where it will now be constrained to be in contact with the sidewall 18 at one or more points. Because of all the constraints on the object in its final position, the object can only have one of a small finite number of possible orientations. When the object comes to rest, the vibration is turned off.

Although one can always imagine a pathologically shaped object for which such a device would fail totally, such as a sphere with a small blind hole which would emerge totally disoriented, it is highly unlikely that production engineers would allow such parts design in the first place. Although the orienting box 16 would leave an ordinary screw in a final position with an unknown axial rotation, this would be of little consequence since the typical power screw driver automatically finds the slot in the screw, thereby rendering it unnecessary to know the rotation of the screw.

The orientation box 16 can either contain sensors or be associated with sensors which are interfaced by cells 40 to a controller or a computer 41 which controls a robot manipulator 43. The signal as provided by the sensors 38 to the computer 41 enables the computer to distinguish which of the finite number of possible orientations have been taken by the object without the need for the robot manipulator 43 to sense anything. When the sensors are few in number and present a small number of digital inputs to the interface, the computer can distinguish the unique orientation by a table lookup on the input sensor bit pattern rather than by a program involving conditional branching.

Figure 2A:
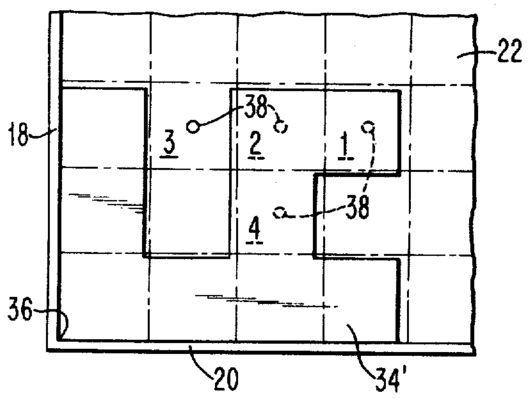
FIGS. 2A and 2B are schematic plan views of the base of FIG. 1 showing one arrangement of object orientation sensors on the base adapted to a particular object shape.
Figure 2B:
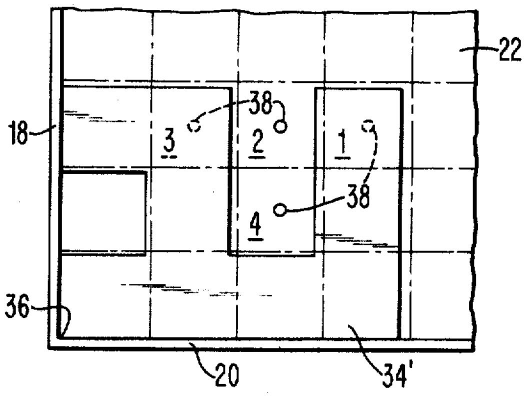
Figure 3A:
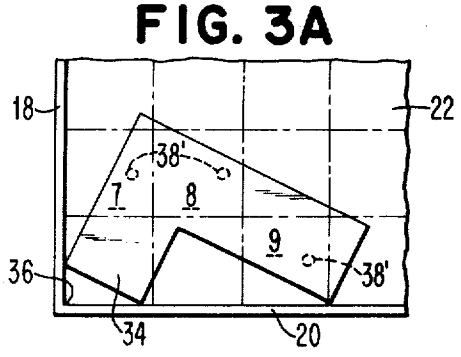
FIGS. 3A and 3B are schematic plan views of the base in FIG. 1 showing another arrangement of object orientation sensors on the base adapted to detecting the orientation of another particular object shape shown in FIG. 1.
Figure 3B:
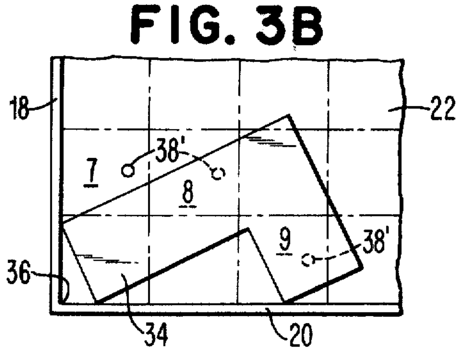
Figure 4A:
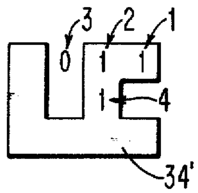
FIGS. 4A to 4H show all possible orientations of the object shown in FIGS. 2A and 2B in the box of FIG. 1, with the test results for sensores whose order and readings are indicated alongside.
Figure 4B:
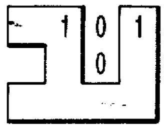
Figure 4C:
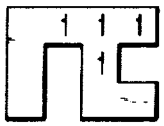
Figure 4D:
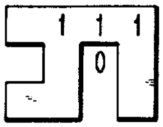
Figure 4E:
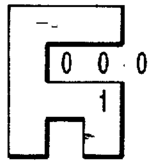
Figure 4F:
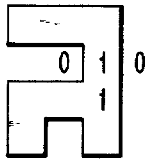
Figure 4G:
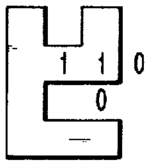
Figure 4H:
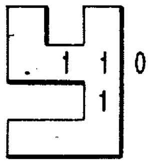
Figure 5A:
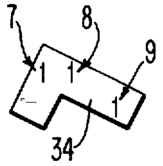
FIGS. 5A to 5F show all 6 possible orientations of the object shown in FIGS. 3A and 3B in the box of FIG. 1 with the test results for sensors whose order and readings are indicated alongside.
Figure 5B:
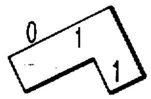
Figure 5C:
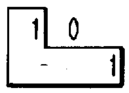
Figure 5D:
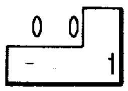
Figure 5E:
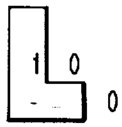
Figure 5F:
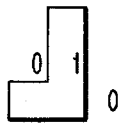

Arrangements of such sensors are shown in FIGS. 2A, 2B, 3A and 3B in a very schematic manner. The surface of the base 22 adjacent the corner 36 contains 2 sets of sensors 38 and 38' located at strategically selected points depending upon the shape of the objects. The sensors 38 in FIGS. 2A and 2B and 38' in FIGS. 3A and 3B may be any of the well known object sensing devices such as an air jet, a photo cell, a magnetic detector or the like. The sensors would be arranged to provide a 1 signal for the presence of an object or a 0 signal for an absence of an object at that particular point. Thus, the arrangement, is capable of giving unique sets of digital readouts for different object orientations. Assuming a 1 means the presence of a part and a 0 means the absence of a part, the digital readout for sensor test at positions 4, 3, 2, 1 in FIGS. 2A and 4A is 1011 and in FIGS. 2B and 4B is 0101. The digital readout for test at positions 9, 8 and 7 in FIGS. 3A and 5A is 111 and in FIGS 3B and 5B is 110. Thus, different final orientations of the objects 34 and 34' provide different digital readouts as shown in FIGS. 4A to 4H and 5A to 5F which readily can be utilized via line 40 to operate a computer 41 to controll a robot 43 via line 42. The details of the computer controlled robot 43 having arm 44 and gripper 46 with sensors are not presented in the present application since they are well known in the art and do not constitute a part of the present invention. Reference may be made to V. D. Scheinman, "Design of a Computer Manipulator", Stanford Artificial Intelligence Report, Memo No. 92, June, 1969; R. Paul, "Modelling, Trajectory Calculation and Serving of a Computer Controlled Arm", Stanford Artificial Intelligence Laboratory Report, Memo AIM-177, November, 1972; also Memo AIM-178.

Although the sensors 38 and 38' are shown as being integrated into the base 22, an alternative is to have an image dissector camera or video camera looking down on the base from above. This camera can input to the computer signals indicating the presence or absence of the objects at the points where sensors 38 and 38' are shown. For this purpose the box would be a different shade or color than the objects. Because this use of a camera involves scanning only a small finite set of points it is quite dissimilar to the state of the art use of a camera for orientation in which arrays of hundreds of points are scanned. The reason for the difference is that unlike the state of the art approach this invention constrains the object to be in one of a small number of possible orientations.

Another alternative way of sensing the final orientation is to have sensors attached to the device which determine the weight distribution of the object in the box. For example, there could be strain gauges attached to legs 24, 26, and 28 which measure the compression of these legs due to the weight of the box and the object.

Although the sides 18 and 20 of the box are illustrated as being disposed at right angles to each other and the base 22 it is also possible to incline the sides at other angles relative to each and to the base. It is also possible to provide the box with additional sides, if necessary.

While the invention is intended to determine the orientation of a known object, the technique can also be extended to determine the identity and orientation of an unknown object, provided the object belongs to a class of known object types.

Note that computer 41 can turn off jogger 12 after a part is oriented via line 47 providing power to jogger 12.

The gripper sensors can also be employed to feed object orientation data to the computer 41.

While the invention has been particularly shown and disclosed with reference to a preferred embodiment thereof, it will be understood by those skilled in the art, that various changes in form and detail may be made therein without departing from the spirit and scope of the invention.

What is claimed is:

1. An object orienting and position sensing device for orienting an object in one of a plurality of stable positions and sensing which of the positions the object is oriented in comprising a box having at least two sides and a base intersecting at a common point, supporting means mounting said box with said base tilted at a dihedral angle relative to the horizontal with said common point disposed lowermost, means for vibrating said box whereby an object is oriented into one of a small number of possible stable positions and sensing means associated with said box to sense the final oriented position of an object upon a base adjacent said common point whereby the actual orientation is uniquely indentified, said object having a shape such that in its final position said object contacts said bottom and said two sides resulting from said object being conveyed into the corner region defined by the intersection of said bottom and said side walls, further said object having a geometric shape capable of having a plurality of final stable positions which can be uniquely indentified relative to any other final stable position by said sensing means.

2. A device as set forth in claim 1 wherein said sensing means are comprised of a plurality of sensors.

3. A device as set forth in claim 2 wherein said plurality of sensors are disposed in a predetermined pattern adapted to distinguish between unique finally oriented positions of an object having a predetermined shape which is initially disposed in a random position on said base remote from said common point.

4. An object orienting device as set forth in claim 1 wherein said base is provided with an anti-friction surface.

5. A device as set forth in claim 1 further comprising a computer connected to said sensing means, robot means connected to be driven by said computer and actuating means for said robot means, said computer being connected to said actuating means for inducing said actuating means for driving said robot means to operate upon said object as a function of input from said sensing means.

6. A device as set forth in claim 5 wherein said robot means is provided with means for grasping and manipulating said object.

* * * * *